United States Patent
Wach et al.

(10) Patent No.: US 9,938,919 B2
(45) Date of Patent: Apr. 10, 2018

(54) METHOD AND CONTROLLER FOR SETTING THE COMBUSTION PARAMETERS FOR AN INTERNAL COMBUSTION ENGINE OPERATED WITH LIQUEFIED NATURAL GAS

(71) Applicant: Robert Bosch GmbH, Stuttgart (DE)

(72) Inventors: Achim Wach, Markgroeningen (DE); Juergen Foerster, Ingersheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 285 days.

(21) Appl. No.: 14/748,683

(22) Filed: Jun. 24, 2015

(65) Prior Publication Data
US 2015/0377155 A1   Dec. 31, 2015

(30) Foreign Application Priority Data

Jun. 26, 2014 (DE) .......................... 10 2014 212 317

(51) Int. Cl.
*F02D 33/00* (2006.01)
*F02D 41/06* (2006.01)
(Continued)

(52) U.S. Cl.
CPC .......... *F02D 41/062* (2013.01); *F02D 19/027* (2013.01); *F02D 41/0027* (2013.01);
(Continued)

(58) Field of Classification Search
CPC .. F02D 41/062; F02D 19/027; F02D 41/0027; F02D 2200/0612;
(Continued)

(56) References Cited

U.S. PATENT DOCUMENTS 5,692,478 A * 12/1997 Nogi ........................ F02B 37/16
                                                                   123/494
5,806,490 A *  9/1998 Nogi ........................ F02B 37/16
                                                                   123/435

(Continued)

FOREIGN PATENT DOCUMENTS

DE          60001644          12/2003

*Primary Examiner* — Stephen K Cronin
*Assistant Examiner* — Susan Scharpf
(74) *Attorney, Agent, or Firm* — Norton Rose Fulbright US LLP; Gerard Messina

(57) ABSTRACT

A method is provided for setting combustion parameters of an internal combustion engine operated with liquefied natural gas, the combustion parameters being sensed during operation of the internal combustion engine and being stored upon shutoff of the internal combustion engine. Also provided is a controller for carrying out the method. Provision is made that during a stoppage of the internal combustion engine, the duration of the stoppage, the ambient temperature and/or tank temperature, and the pressure in a liquefied gas tank are sensed; the influence thereof on a required adaptation of the combustion parameters that are to be set is identified from a characteristics diagram; and from the stored combustion parameters and the adaptation, initial combustion parameters are identified and are used upon startup of the internal combustion engine in order to control it.

5 Claims, 1 Drawing Sheet

(51) Int. Cl.
   *F02D 19/02*   (2006.01)
   *F02D 41/00*   (2006.01)
   *F02M 21/02*   (2006.01)

(52) U.S. Cl.
   CPC .... *F02M 21/0215* (2013.01); *F02M 21/0221* (2013.01); *F02D 2200/0612* (2013.01); *Y02T 10/32* (2013.01)

(58) Field of Classification Search
   CPC ............ F02M 21/0215; F02M 21/0221; Y02T 10/32; F02N 11/0811
   USPC .................................. 123/435; 701/104, 113
   See application file for complete search history.

(56) References Cited

U.S. PATENT DOCUMENTS

| | | | |
|---|---|---|---|
| 6,053,036 A * | 4/2000 | Uto | F02D 41/0042 701/103 |
| 6,267,104 B1 * | 7/2001 | Monnier | F02M 25/089 123/179.17 |
| 6,910,468 B2 * | 6/2005 | Yamaoka | F02M 37/20 123/527 |
| 7,207,321 B2 * | 4/2007 | Vadimovitch | C10L 1/023 123/27 GE |
| 7,373,932 B2 * | 5/2008 | Hayashi | F02M 21/06 123/527 |
| 7,383,804 B2 * | 6/2008 | Wolber | F02D 41/062 123/179.16 |
| 7,506,638 B2 * | 3/2009 | Shinkarenko | F02M 31/20 123/27 GE |
| 2007/0233357 A1 * | 10/2007 | Sugai | B60K 6/48 701/105 |
| 2012/0085326 A1 * | 4/2012 | Mo | F02D 19/061 123/526 |
| 2015/0226140 A1 * | 8/2015 | Zhang | F02D 41/0027 123/497 |
| 2015/0233310 A1 * | 8/2015 | Zhang | F02D 19/06 701/54 |

* cited by examiner

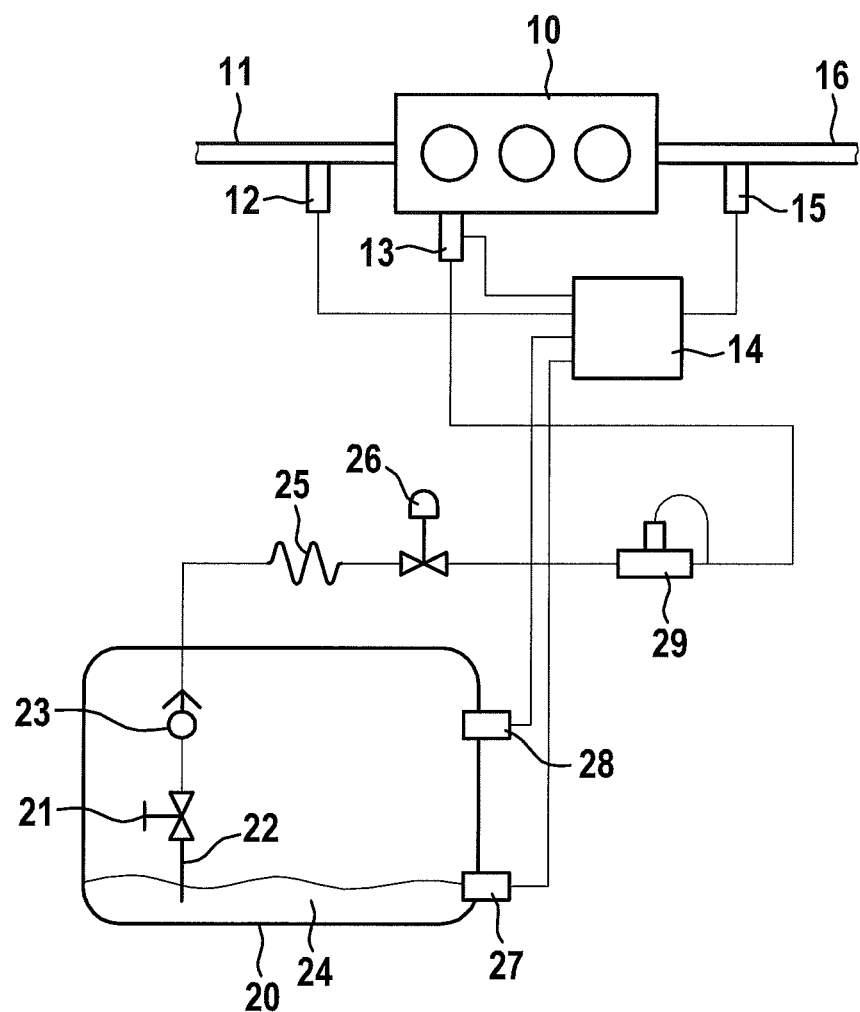

METHOD AND CONTROLLER FOR SETTING THE COMBUSTION PARAMETERS FOR AN INTERNAL COMBUSTION ENGINE OPERATED WITH LIQUEFIED NATURAL GAS

FIELD OF THE INVENTION

The present invention relates to a method for setting combustion parameters of an internal combustion engine operated with liquefied natural gas, the combustion parameters being sensed during operation of the internal combustion engine and being stored upon shutoff of the internal combustion engine.

The invention furthermore relates to a controller for setting combustion parameters of an internal combustion engine operated with liquefied natural gas, the combustion parameters being sensed in the controller during operation of the internal combustion engine and being stored upon shutoff of the internal combustion engine.

BACKGROUND INFORMATION

The composition of liquefied natural gas (LNG) changes in the context of storage in a tank, depending on the storage duration and the storage temperature. It is furthermore known that the composition of liquefied natural gas differs in country-specific fashion, and for example that the proportion of methane and also of residual constituents is different. The power generated by an internal combustion engine operated with liquefied natural gas, as well as the composition of the exhaust gases emitted by it, depend on the composition of the liquefied natural gas. It is therefore necessary to adapt the combustion parameters of an internal combustion engine operated with liquefied natural gas to the currently available composition.

It is known from the existing art to store the combustion parameters of an internal combustion engine operated with liquefied natural gas upon shutoff of the internal combustion engine, and to use them at the next startup as initial parameters for controlling combustion. In this context, data regarding the composition of the gas/air mixture are sensed from lambda probes and stored, and data regarding mixture adaptation and natural gas quality are also stored.

German Patent No. 60001644 T2 describes a method for identifying the proportion of one of the components, or the ratio of two of the components, of a fluid mixture of liquid natural gas, having the method steps of measuring the thermal conductivity of the liquid natural gas at a first temperature, measuring the thermal conductivity of the liquid natural gas at a second temperature, and deducing the proportion of the one of the components, or the ratio of two of the components, of the liquid natural gas from the two thermal conductivity measurements.

The document furthermore describes an engine management system for an engine operated with LNG, having an apparatus as recited in one of the claims of German Patent No. 60001644 T2 for identifying the proportion of one of the components, or the ratio of two of the components, of LNG fuel, and having means for modifying one or more parameters in accordance with the ascertained proportion of one of the components, or the ratio of two of the components, of the LNG fuel. This existing art is disadvantageous in that upon startup of the internal combustion engine, the current composition of the liquefied natural gas must first be identified.

SUMMARY

An object of the invention is therefore to furnish a method that makes it possible, in the context of operation of an internal combustion engine with liquefied natural gas, to adapt the combustion parameters of said engine to the current gas composition immediately upon startup thereof.

A further object of the invention is to furnish a controller suitable for carrying out the method.

The object of the invention relating to the method is achieved in that during a stoppage of the internal combustion engine, the duration of the stoppage, the ambient temperature and/or tank temperature, and the pressure in a liquefied gas tank are sensed; the influence thereof on a required adaptation of the combustion parameters that are to be set is identified from a characteristics diagram; and from the stored combustion parameters and the adaptation, initial combustion parameters are identified and are used upon startup of the internal combustion engine in order to control it.

As in the existing art, the combustion parameters of an internal combustion engine operated with liquefied natural gas are sensed during operation, for example by way of lambda probes, and are stored, together with data regarding mixture adaptation and gas quality, upon shutoff of the internal combustion engine. According to the present invention these data are updated using data regarding the change in the properties of the liquefied natural gas resulting from storage duration in the tank, and from the temperature and pressure during storage. The data thereby updated are used as combustion parameters upon startup of the internal combustion engine, and thus ensure optimized combustion with optimum power output and decreased emissions in the exhaust gas.

In order to ascertain the required adaptation, the latter is ascertained beforehand as a function of storage duration, temperature, and pressure in the storage tank, and is retained by way of diagram templates or characteristics diagrams. These data then serve, in the controller of the internal combustion engine, to identify the required correction.

In an embodiment of the method, provision is made that for the duration of the stoppage, the time course of the ambient temperature and/or tank temperature, and the pressure in the liquid gas tank, are sensed and taken into account.

The object of the invention relating to the controller is achieved in that a circuit or program sequence for sensing the duration of the stoppage, the ambient temperature and/or tank temperature, and the pressure in the liquid gas tank is provided in the controller; furthermore a circuit or program sequence is provided for ascertaining from a characteristics diagram the required adaptation of the combustion parameters that are to be set, and for identifying initial combustion parameters from the stored combustion parameters and the adaptation, and for using said initial combustion parameters upon startup of the internal combustion engine.

BRIEF DESCRIPTION OF THE DRAWING

The FIGURE shows the technical environment of the invention.

DETAILED DESCRIPTION

The FIGURE shows an internal combustion engine 10 having an air inlet 11 and an exhaust gas conduit 16. An air mass meter 12 is mounted in air inlet 11, and a lambda probe 15, whose signals are delivered to a controller 14, is mounted in exhaust gas conduit 16. Fuel is delivered to internal combustion engine 10 via a fuel metering system 13 to which control is applied via controller 14. Controller 14 meters the fuel in on the basis of the current combustion parameters and the signals of air mass meter 12 and of lambda probe 15.

Liquefied natural gas 24 is stored in a liquid gas tank 20 as a fuel for operating internal combustion engine 10. Liquefied natural gas 24 is taken off via a takeoff conduit 22 and delivered via a first shutoff valve 21 and a flow rate limiter 23 to a heat exchanger 25, in which it is converted into the gaseous state. From heat exchanger 25, the gas is delivered via a second shutoff valve 26 and an overpressure regulator 29 to fuel metering system 13.

Provision is made according to the present invention that, when internal combustion engine 10 is stopped, signals of a temperature sensor 27 and of a pressure sensor 28, both of which monitor the storage parameters in liquid gas tank 20, are sensed in controller 14. Together with the duration of storage, a correction of the combustion parameters that is required on the basis of the empirical change in the composition of liquefied natural gas 24 upon storage is identified in the controller. Upon startup of internal combustion engine 10, this correction is taken into account in the control of fuel metering system 13. The result is to achieve, immediately at startup, optimum combustion with optimum power output and low emissions.

What is claimed is:

1. A method for setting a combustion parameter of an internal combustion engine operated with liquefied natural gas, comprising:
   sensing the combustion parameter during operation of the internal combustion engine;
   storing the combustion parameter upon shutoff of the internal combustion engine;
   during a stoppage of the internal combustion engine, sensing a pressure of a liquefied gas tank, a duration of the stoppage, an ambient temperature, and a tank temperature;
   identifying from a characteristics diagram as a function of (i) the pressure of the liquefied gas tank sensed during the stoppage, (ii) the duration of the stoppage sensed during the stoppage, (iii) the ambient temperature sensed during the stoppage, and (iv) the tank temperature sensed during the stoppage, a required adaptation of the combustion parameter that is to be set; and
   from the stored combustion parameter and the adaptation, identifying an initial combustion parameter; and
   starting the internal combustion engine, and, upon the starting, controlling the internal combustion engine using the initial combustion parameter.

2. The method as recited in claim 1, wherein for the duration of the stoppage, a time course of at least one of an ambient temperature and the tank temperature, and the pressure in the liquid gas tank, are sensed and taken into account.

3. The method as recited in claim 1, wherein the controlling of the internal combustion engine includes controlling a fuel metering system of the internal combustion engine using the initial combustion parameter.

4. A controller for setting a combustion parameter of an internal combustion engine operated with liquefied natural gas, the combustion parameter being sensed in the controller during operation of the internal combustion engine and being stored upon shutoff of the internal combustion engine, comprising:
   one of a circuit and a program sequence for sensing, during a stoppage of the internal combustion engine, a pressure in a liquefied gas tank, a duration of the stoppage, an ambient temperature, and a tank temperature; and
   one of a circuit and a program sequence for ascertaining from a characteristics diagram as a function of (i) the pressure of the liquefied gas tank sensed during the stoppage, (ii) the duration of the stoppage sensed during the stoppage, (iii) the ambient temperature sensed during the stoppage, and (iv) the tank temperature sensed during the stoppage, a required adaptation of the combustion parameter that is to be set, and for identifying an initial combustion parameter from the stored combustion parameter and the adaptation, and for starting the internal combustion engine, and, upon the starting, controlling the internal combustion engine using the initial combustion parameter.

5. The controller as recited in claim 4, wherein the controlling of the internal combustion engine includes controlling a fuel metering system of the internal combustion engine using the initial combustion parameter.

* * * * *